March 31, 1925.  
C. H. HUTCHINSON  
VALVE STEM GUARD  
Filed Dec. 24, 1923  
1,531,861

Inventor  
C. H. Hutchinson,  
By Milo B. Stevens & Co.  
Attorney

Patented Mar. 31, 1925.

1,531,861

UNITED STATES PATENT OFFICE.

CLARENCE H. HUTCHINSON, OF EAU CLAIRE, WISCONSIN.

VALVE-STEM GUARD.

Application filed December 24, 1923. Serial No. 682,475.

*To all whom it may concern:*

Be it known that I, CLARENCE H. HUTCHINSON, a citizen of the United States, residing at Eau Claire, in the county of Eau Claire and State of Wisconsin, have invented new and useful Improvements in Valve-Stem Guards, of which the following is a specification.

This invention relates to guards especially adapted for use on the valve stems of pneumatic tires.

In all devices of this character with which I am familiar no means are provided to hold the guard in position during improper inflation of the tire or during that period when the main holding nut on the valve stem is not tight.

Therefore, an important object of this invention is to provide a valve stem guard which will maintain a water and moisture tight connection between the valve stem and the rim at all times so that when there is a tendency for the valve stem to fall away from the rim during under inflation of the tire the water or moisture cannot enter and cause rust.

A further object is to provide a valve stem guard wherein the accidental loosening of the main holding nut on the valve stem will not result in the breaking of the connection between the rim and the valve stem and wherein the pressure within the tire is utilized to maintain an absolutely moisture tight connection between the guard and the valve stem and between the guard and the rim.

Also, an important object is to provide a valve stem guard which will permit a limited lateral movement of the valve stem with relation to the rim without breaking the moisture tight connection between the parts, and without the possibility of rupturing the connection between the valve stem and the inner tube.

A further object is to provide a valve stem guard which is of highly simplified construction, durable in use and cheap to manufacture.

Other objects and advantages will be apparent during the course of the following description.

In the accompanying drawing forming a part of this application and in which like numerals are employed to designate like parts throughout the same.

Figure 1:
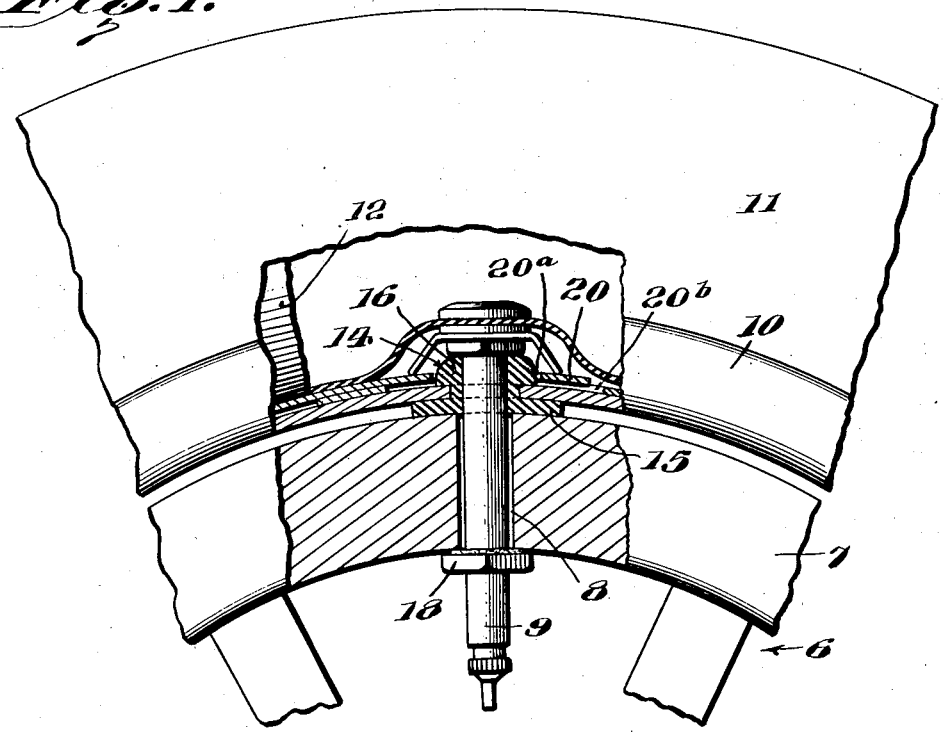
Figure 1 is a sectional view through the improved guard applied.
Figure 2:
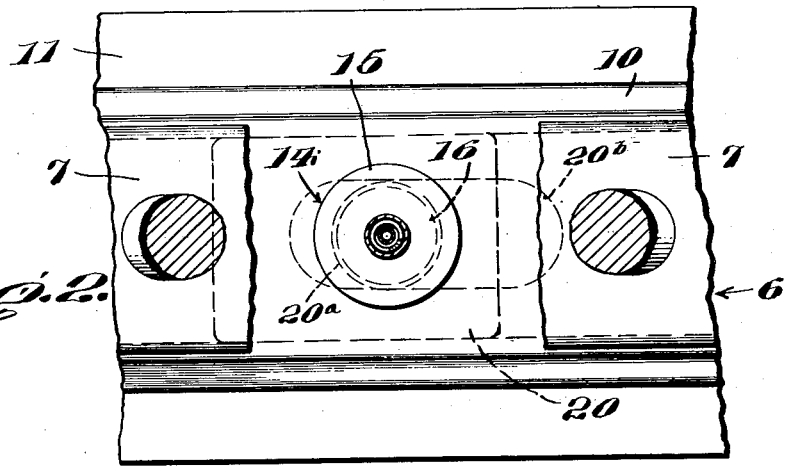
Figure 2 is a plan view of the guard applied.
Figure 3:
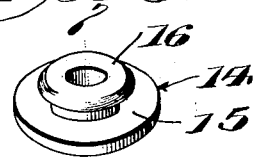
Figure 3 is a perspective of the guard.

In the drawing wherein for the purpose of illustration is shown a preferred embodiment of the invention the numeral 6 designates a wheel having the usual felly 7 provided with an opening 8 for the reception of a valve stem 9.

Figure 1 illustrates that a rim 10 is arranged about the felly 7 and carries a casing 11 of an inner tube 12, the said inner tube having connection in the usual manner with the valve stem.

The invention forming the subject matter of this application is especially adapted to establish an absolutely moisture tight connection between the valve stem and the rim and to this end I provide a guard generally designated by the numeral 14.

It is important to note that the guard 14 is of rubber or other inherently elastic or yieldable material having the necessary wear resisting qualities. The guard 14 is in the nature of a tubular body having what might be said to be its inner end provided with a wide base flange 15 adapted to be positioned between the rim and the felly. The outer end of the tubular body or shank is provided with a somewhat narrower annular flange 16 which flatly contacts with the outer face of the rim. The usual circumferential fabric tube protecting tongue is shown at 20.

In use the guard is positioned on the stem 9 with the flanges 15 and 16 flatly contacting with opposite sides of the rim. It will be seen that the spaced annular flanges 15 and 16 define an annular groove for the reception of the wall of the opening in the rim. In case the nut 18 on the valve stem 9 is accidentally loosened the valve stem may move inwardly, but a liquid and moisture tight connection between the valve stem and the rim will be maintained.

Due to the inherent elasticity of the guard it will hug the valve stem and absolutely prevent the entrance of dust, moisture or water and thus the tongue 20 or other parts of the organization will be prevented from rusting to the rim.

The pressure within the tube is utilized to tighten the connection between the valve stem and the guard as the guard is compressed longitudinally and consequently spread laterally. This lateral spreading not only forces the guard more tightly into engagement with the valve stem but also forces the guard more tightly into engagement with the rim to positively prevent the entrance of undesirable elements.

Furthermore the stem 9 may move a limited extent laterally of the rim or circumferentially thereof without breaking the moisture tight connection between the valve stem and the guard as the guard due to its inherent elasticity will continue to hug the tube and the rim.

The foregoing illustrates that the invention absolutely excludes dust, water and moisture and permits the tube to move longitudinally or laterally without impairing the element excluding qualities of the guard. Furthermore, regardless of the degree of inflation, the device remains effective.

The invention has been illustrated in connection with a rim of the so called "straight side" type although it will be understood that it is equally adaptable for use in connection with rims of the clencher type. The space between the rim and felly is greater when rims of the "straight side" type are used and the presence of the flange 15 is therefore especially desirable to aid in preventing the ingress of foreign matter through the valve stem opening. It should also be noted that the circumferential tube protecting tongue 20 having the usual annular and elongated valve stem receiving openings 20ª and 20ᵇ, respectively, often tends to pull the valve stem 9 circumferentially through the medium of the opening 20ª upon over inflation of the tire or upon jamming of the said tongue at some point in its circumference. However this action, as heretofore intimated, will not affect the functioning of my improved guard since the latter is carried by the rim and not by the valve stem as has heretofore been the practice. The guard 14 does not interfere with the placing of the tongue 20 which may be applied in the usual manner after the guard is in place.

Having thus described my invention, what I claim is:—

1. A guard for the valve stems of tires comprising a longitudinally and laterally compressible body adapted to receive a valve stem, the end portions of the tubular body being provided with annular flanges adapted to engage opposite sides of a tire rim whereby to establish a liquid tight connection between the valve stem and the rim.

2. A guard for valve stems of tires comprising a tubular body adapted to snugly receive the valve stem of a tire, said tubular body being provided with spaced inner and outer flanges adapted to contact with opposite sides of a tire rim, said flanges also co-operating with said tubular body in the formation of an annular groove for the reception of a portion of the tire rim.

3. A valve stem guard for tires comprising a tubular body adapted to snugly receive the valve stem of a tire and having spaced inner and outer annular flanges adapted to flatly contact with opposite sides of a rim, said tubular body and said flanges being inherently elastic whereby the same may be compressed longitudinally or laterally to permit of the longitudinal and lateral movement of the valve stem and to permit of the compression of the flanges by the air pressure within the tire.

4. The combination with a rim having a valve stem opening, of a tube arranged about the rim and having a valve stem extending through said opening, and a longitudinally and laterally compressible body arranged in said opening and snugly receiving said valve stem, the ends of said compressible body being provided with annular flanges flatly contacting with opposite sides of the rim, said flanges being adapted to have liquid tight connection with the rim and co-operating in the formation of an annular groove for the reception of the portion of said rim adjacent said opening, the inner flange of the body being substantially wider than the other flange of the body and being adapted to flatly contact with the felly of a wheel, the air pressure within the tube being adapted to compress said body and thereby tighten the connection between the body and the valve stem and between the body and the rim.

In testimony whereof I affix my signature.

CLARENCE H. HUTCHINSON.